US008718088B2

(12) United States Patent
Peng et al.

(10) Patent No.: US 8,718,088 B2
(45) Date of Patent: May 6, 2014

(54) SIGNAL CONVERTER OF CONSUMER ELECTRONICS CONNECTION PROTOCOLS

(75) Inventors: Bo Peng, Shanghai (CN); Zhong Yu, Shanghai (CN); Jack Yuan, Saratoga, CA (US); Chunmei Li, Shanghai (CN); Dong Pan, Andover, MA (US)

(73) Assignee: SiFotonics Technologies Co, Ltd., Woburn, MA (US)

( * ) Notice: Subject to any disclaimer, the term of this patent is extended or adjusted under 35 U.S.C. 154(b) by 91 days.

(21) Appl. No.: 13/470,153

(22) Filed: May 11, 2012

(65) Prior Publication Data

US 2012/0287942 A1   Nov. 15, 2012

Related U.S. Application Data

(60) Provisional application No. 61/518,914, filed on May 13, 2011.

(51) Int. Cl.
*H04J 15/00* (2006.01)

(52) U.S. Cl.
USPC .......................................................... 370/464

(58) Field of Classification Search
CPC ............................................. H04L 2012/5604
USPC ............ 370/464–467, 474, 532–538; 398/43, 398/74, 140
See application file for complete search history.

(56) References Cited

U.S. PATENT DOCUMENTS

| 4,860,286 | A  | * | 8/1989  | Forsberg et al. ............... | 370/510 |
|-----------|----|---|---------|--------------------------------|---------|
| 7,499,462 | B2 | * | 3/2009  | MacMullan et al. ........... | 370/401 |
| 7,548,675 | B2 | * | 6/2009  | Tatum et al. ................... | 385/100 |
| 7,729,618 | B2 | * | 6/2010  | Tatum et al. ................... | 398/139 |
| 8,315,272 | B2 | * | 11/2012 | Baumer .......................... | 370/465 |
| 2009/0022176 | A1 | * | 1/2009 | Nguyen .......................... | 370/466 |

OTHER PUBLICATIONS

High-Definition Multimedia Interface, Wilkipidia, dowloaded on Sep. 2007, 10 pages.*

* cited by examiner

*Primary Examiner* — Dmitry H Levitan
(74) *Attorney, Agent, or Firm* — Han IP Corporation

(57) ABSTRACT

Methods and devices of converting signals of consumer electronics connection protocols to high speed bi-directional signals are presented. A novel packing method packs all the data, clocks, and control signals into one or more packets of a predefined format. A novel unpacking method unpacks the packets to original data, clocks, and control signals.

23 Claims, 14 Drawing Sheets

For Example:

PACKET_0[64:1] = {EN_AV, RD_RX[15:0], GD_RX[15:0], BD_RX[15:0], DDC_RX_SCL_I,
    DDC_RX_SDA_I, CEC_RX_I, HEC_FW[3:0], EN_HEX_FW, RESERVE[6:0]}

PACKET_x[64:1] = {EN_AV, RD_RX[15:0], GD_RX[15:0], BD_RX[15:0], DDC_RX_SCL_I,
    DDC_RX_SDA_I, CEC_RX_I, Stuff[3:0], EN_HEX_FW, RESERVE[6:0]}

PACKET_y[64:1] = {EN_AV, M_AV[47:32], M_AV[32:16], M_AV[15:0], DDC_RX_SCL_I,
    DDC_RX_SDA_I, CEC_RX_I, M_HEC_FW[3:0], EN_HEX_FW, RESERVE[6:0]}

For Example:

PACKET_0[16:1] = {DDC_TX_SCL_I, DDC_TX_SDA_I, CEC_TX_I, HEC_RT[3:0], EN_HEC_RT, ARC[3:0], EN_ARC, HPD, RESERVE[1:0]}

PACKET_x[16:1] = {DDC_TX_SCL_I, DDC_TX_SDA_I, CEC_TX_I, Stuff[3:0], EN_HEC_RT, ARC[3:0], EN_ARC, HPD, RESERVE[1:0]}

PACKET_y[16:1] = {DDC_TX_SCL_I, DDC_TX_SDA_I, CEC_TX_I, M_HEC_RT[3:0], EN_HEC_RT, Stuff[3:0], EN_ARC, HPD, RESERVE[1:0]}

For Example:

PACKET_0[64:1] = {EN_AV, RD_RX[19:0], GD_RX[19:0], BD_RX[19:0], DDC_RX_SCL_I, DDC_RX_SDA_I, CEC_RX_I}

PACKET_x[64:1] = {EN_AV, Stuff[59:40], Stuff[39:20], Stuff[19:0], DDC_RX_SCL_I, DDC_RX_SDA_I, CEC_RX_I}

For Example:

PACKET_0[32:1] = {EN_SS, SS[19:0], Data[3:0], EN_Data, HS/FS/LS_CNT[2:0], 3'bXXX}

PACKET_x[32:1] = {EN_SS, SS[19:0], Stuff[3:0], EN_Data, HS/FS/LS_CNT[2:0], 3'bXXX}

PACKET_y[32:1] = {EN_SS, M_SS[19:0], M_Data[3:0], EN_Data, HS/FS/LS_CNT[2:0], 3'bXXX}

SIGNAL CONVERTER OF CONSUMER ELECTRONICS CONNECTION PROTOCOLS

CROSS-REFERENCE TO RELATED PATENT APPLICATIONS

This application claims priority to U.S. Patent Application Ser. No. 61/518,914, entitled "Pack/unpack method of high/low speed data and clock in HDMI extender", filed on May 13, 2011, which is herein incorporated by reference in its entirety.

BACKGROUND

1. Technical Field

The present disclosure relates to signal conversion. More particularly, the present disclosure relates to signal conversion of consumer electronics connection protocols.

2. Description of Related Art

In terms of signal transmission, traditional copper wire cables impose limits on signal transmission distance and signal quality. At present time, various protocols of consumer electronics connection have been developed and tend to use more and more signal pins. For example, the Universal Serial Bus (USB) 3.0 standard utilizes three pairs of differential signals, and one differential pair utilized by the USB 2.0 standard is bi-directional. A digital-only connector based on the Digital Video Interactive (DVI) standard has three or six transition-minimized differential signaling (TMDS) data channels, a TMDS clock channel, a Display Data Channel (DDC) channel and hot plug detect. The DDC is bi-directional. The High-Definition multimedia Interface (HDMI) 1.4a standard includes three or six TMDS data channels, a TMDS clock channel, a DDC channel, a Consumer Electronics Control (CEC) channel, a HDMI Ethernet and Audio return Channel (HEAC) channel and hot plug detect. The DDC, CEC and HEAC channels are bi-directional.

The form factor of existing consumer electronics protocols-based connectors tends to be overly large to be accepted by receptacles of popular handheld devices. To render the connectors smaller, one approach is to bundle the high/low-speed data, clock, control signals into a high speed signal so that the pin count can be reduced.

The data rate of these signals in consumer electronics, transmitted over copper wires, is much slower than the available data rate of optical communication. Features of optical communication include: high bandwidth, fixed data rate, better signal quality and long signal transmission distance. Although optical fibers support bi-directional transmission with dense wavelength multiplexing (DWM), optical devices such as photodiodes, vertical-cavity surface-emitting lasers (VCSEL) and laser diodes do not. Moreover, one channel of optical connection is generally much more expensive than a copper wire. Thus, it is desirable and would be cost effective to convert all the signals transmitted in consumer electronics connection into one or more high-speed signals which are suitable for optical communication.

SUMMARY

According to one aspect, a signal conversion method may comprise: receiving, in parallel, a first plurality of digital signals at a first clock rate and a second plurality of digital signals at a second clock rate which is slower than the first clock rate; forming one or more forward data packets in a predefined format based at least in part on the first plurality and the second plurality of digital signals; and transmitting, in series, the one or more forward data packets at a third clock rate which is faster than the first clock rate.

In one embodiment, forming one or more forward data packets in a predefined format based at least in part on the first plurality and the second plurality of digital signals may comprise: deserializing the first plurality of digital signals; generating digital codes according to a frequency ratio of the first clock rate and the third clock rate; oversampling the second plurality of digital signals; packing the deserialized first plurality of digital signals, digital codes of the first clock rate, and the oversampled second plurality of digital signals into the one or more forward data packets in the predefined format; and serializing the one or more forward data packets.

In one embodiment, forming one or more forward data packets in a predefined format based at least in part on the first plurality and the second plurality of digital signals may comprise: deserializing the first plurality of digital signals; generating digital codes according to a frequency ratio of the first clock rate and the third clock rate; deserializing the second plurality of digital signals; generating digital codes according to a frequency ratio of the second clock rate and the third clock rate; packing the deserialized first plurality of digital signals, the deserialized second plurality of digital signals, and digital codes of the first, second and third clock rates into the one or more forward data packets in the predefined format; and serializing the one or more forward data packets.

In one embodiment, transmitting one or more forward data packets may comprise transmitting the one or more forward data packets over one or more fiber optic channels, over one or more copper wires, or wirelessly.

In one embodiment, the first plurality of digital signals and the second plurality of digital signals may be based on one or more of the HDMI (e.g., HDMI 1.4a) standard, the DVI standard, the RS-232 standards, and the USB (e.g., USB 3.0) standard.

In one embodiment, the method may further comprise: receiving, in series, one or more return data packets at a fourth clock rate; and converting the one or more return data packets into a fourth plurality of digital signals at the second clock rate which is slower than the fourth clock rate.

In one embodiment, at least some of the fourth plurality of digital signals may comprise the second plurality of digital signals.

According to another aspect, a signal conversion method may comprise: receiving, in series, one or more forward data packets that are in a predefined format at a third clock rate; converting the one or more forward data packets into a first plurality of digital signals at a first clock rate that is slower than the third clock rate and a second plurality of digital signals at a second clock rate that is slower than the first clock rate; and outputting, in parallel, the first plurality of digital signals and the second plurality of digital signals.

In one embodiment, converting the one or more forward data packets into a first plurality of digital signals at a first clock rate that is slower than the third clock rate and a second plurality of digital signals at a second clock rate that is slower than the first clock rate may comprise: deserializing the one or more forward data packets; unpacking the deserialized one or more forward data packets into the first plurality of digital signals, digital codes of the first clock rate, and the second plurality of digital signals; generating digital codes according to a number of bytes of the first plurality of digital signals received during an interval of a predefined number of cycles of a clock according to the third clock rate; recovering the first clock rate with either the generated digital codes and the third clock rate or the digital codes of the first clock rate unpacked from the deserialized one or more forward data packets; and serializing the first plurality of digital signals.

In one embodiment, converting the one or more forward data packets into a first plurality of digital signals at a first clock rate that is slower than the third clock rate and a second plurality of digital signals at a second clock rate that is slower than the first clock rate may comprise: deserializing the one or more forward data packets; unpacking the deserialized one or more forward data packets into the first plurality of digital signals, the second plurality of digital signals, and digital codes of the first clock rate and the second clock rate; generating first digital codes according to a number of bytes of the first plurality of digital signals received during an interval of a predefined number of cycles of a clock according to the third clock rate; recovering the first clock rate with either the generated first digital codes and the third clock rate or the digital codes of the first clock rate unpacked from the deserialized one or more forward data packets; generating second digital codes according to a number of bytes of the second plurality of digital signals received during an interval of the predefined number of cycles of the clock according to the third clock rate; recovering the second clock rate with either the generated second digital codes and the third clock rate or the digital codes of the second clock rate unpacked from the deserialized one or more forward data packets; serializing the first plurality of digital signals; and serializing the second plurality of digital signals.

In one embodiment, receiving one or more forward data packets may comprise receiving the one or more forward data packets over one or more fiber optic channels, over one or more copper wires, or wirelessly.

In one embodiment, the first plurality of digital signals and the second plurality of digital signals may be based on one or more of the HDMI (e.g., HDMI 1.4a) standard, the DVI standard, the RS-232 standards, and the USB (e.g., USB 3.0) standard.

In one embodiment, the method may further comprise: receiving a fourth plurality of digital signals at the second clock rate; packing the fourth plurality of digital signals into one or more return data packets by oversampling at least some of the fourth plurality of digital signals; and transmitting, in series, the one or more return data packets at a fourth clock rate which is faster than the second clock rate.

In one embodiment, at least some of the fourth plurality of digital signals may comprise the second plurality of digital signals.

According to one aspect, a signal conversion device may comprise a forward packing circuit configured to: (1) receive, in parallel, a first plurality of digital signals at a first clock rate and a second plurality of digital signals at a second clock rate that is slower than the first clock rate, and (2) pack the first plurality of digital signals and the second plurality of digital signals into one or more forward data packets having a predefined format and a third clock rate that is faster than the first clock rate. The signal conversion device may additionally comprise a return unpacking circuit configured to: (1) receive one or more return data packets at a fourth clock rate, and (2) unpack the one or more return data packets into at least a fourth plurality of digital signals at the second clock rate which is slower than the fourth clock rate.

In one embodiment, the first plurality of digital signals and the second plurality of digital signals may be based on one or more of the HDMI (e.g., HDMI 1.4a) standard, the DVI standard, the RS-232 standards, and the USB (e.g., USB 3.0) standard.

In one embodiment, the signal conversion device may further comprise an oversampler that receives the second plurality of digital signals in parallel at the second clock, oversamples the second plurality of digital signals, and outputs the oversampled second plurality of digital signals to the forward packing circuit.

In one embodiment, the signal conversion device may additionally comprise a forward deserializer that receives the first plurality of digital signals in parallel at the first clock rate, deserializes the first plurality of digital signals, and outputs a first plurality of deserialized digital signals to the forward packing circuit. The signal conversion device may further comprise a forward serializer that receives the one or more forward data packets from the forward packing circuit, and serializes and transmits the one or more forward data packets in series at a third clock rate which is faster than the first clock rate.

In one embodiment, the forward packing circuit may pack the first plurality of digital signals and the second plurality of digital signals into the one or more forward data packets by: generating digital codes according to a frequency ratio of the first clock rate and the third clock rate; and packing the deserialized first plurality of digital signals, digital codes of the first clock rate, and the oversampled second plurality of digital signals into the one or more forward data packets in the predefined format.

In one embodiment, the forward deserializer may further receive the second plurality of digital signals in parallel at the second clock rate, deserialize the second plurality of digital signals, and output a second plurality of deserialized digital signals to the forward packing circuit. The forward packing circuit may pack the first plurality of digital signals and the second plurality of digital signals into the one or more forward data packets by: generating digital codes according to a frequency ratio of the first clock rate and the third clock rate; generating digital codes according to a frequency ratio of the second clock rate and the third clock rate; and packing the deserialized first plurality of digital signals, the deserialized second plurality of digital signals, and digital codes of the first, second and third clock rates into the one or more forward data packets in the predefined format.

In one embodiment, the forward serializer may transmit the one or more forward data packets over one or more fiber optic channels, over one or more copper wires, or wirelessly.

In one embodiment, the signal conversion device may further comprise a return deserializer that receives, in series, one or more return data packets at a fourth clock rate, deserializes the one or more return data packets, and outputs the deserialized one or more return data packets to the return unpacking circuit.

According to another aspect, a signal conversion device may comprise a forward unpacking circuit configured to: (1) receive one or more forward data packets that are in a predefined format at a third clock rate, (2) unpack the one or more forward data packets into a first plurality of digital signals at a first clock rate that is slower than the third clock rate and a second plurality of digital signals at a second clock rate that is slower than the first clock rate. The signal conversion device may additionally comprise a return packing circuit configured to: (1) receive a fourth plurality of digital signals at the second clock rate, and (2) pack the fourth plurality of digital signals into one or more return data packets having a predefined format and a fourth clock rate that is faster than the second clock rate.

In one embodiment, the first plurality of digital signals and the second plurality of digital signals may be based on one or more of the HDMI (e.g., HDMI 1.4a) standard, the DVI standard, the RS-232 standards, and the USB (e.g., USB 3.0) standard.

In one embodiment, the signal conversion device may further comprise an oversampler that receives the fourth plurality of digital signals in parallel at the second clock, oversamples the fourth plurality of digital signals, and outputs the oversampled fourth plurality of digital signals to the return packing circuit.

In one embodiment, the signal conversion device may additionally comprise a forward deserializer that receives the one or more forward data packets in series at the third clock rate, deserializes the one or more forward data packets, and outputs the deserialized one or more forward data packets to the forward unpacking circuit. The signal conversion device may further comprise a forward serializer that receives the first plurality of digital signals from the forward unpacking circuit, serializes the first plurality of digital signals, and outputs the serialized first plurality of digital signals at the first clock rate.

In one embodiment, the forward unpacking circuit may unpack the one or more forward data packets into the first plurality of digital signals and the second plurality of digital signals by: unpacking the deserialized one or more forward data packets into the first plurality of digital signals, digital codes of the first clock rate, and the second plurality of digital signals; generating digital codes according to a number of bytes of the first plurality of digital signals received during an interval of a predefined number of cycles of a clock according to the third clock rate; and recovering the first clock rate with either the generated digital codes and the third clock rate or the digital codes of the first clock rate unpacked from the deserialized one or more forward data packets.

In one embodiment, the forward unpacking circuit may unpack the one or more forward data packets into the first plurality of digital signals and the second plurality of digital signals by: unpacking the deserialized one or more forward data packets into the first plurality of digital signals, the second plurality of digital signals, and digital codes of the first clock rate and the second clock rate; generating first digital codes according to a number of bytes of the first plurality of digital signals received during an interval of a predefined number of cycles of a clock according to the third clock rate; recovering the first clock rate with either the generated first digital codes and the third clock rate or the digital codes of the first clock rate unpacked from the deserialized one or more forward data packets; generating second digital codes according to a number of bytes of the second plurality of digital signals received during an interval of the predefined number of cycles of the clock according to the third clock rate; and recovering the second clock rate with either the generated second digital codes and the third clock rate or the digital codes of the second clock rate unpacked from the deserialized one or more forward data packets.

In one embodiment, the signal conversion device may further comprise a return serializer that receives the one or more return data packets from the return packing circuit, serializes the one or more return data packets, and transmits the serialized one or more return data packets at the fourth clock rate.

In one embodiment, the return serializer may transmit the serialized one or more return data packets over one or more fiber optic channels, over one or more copper wires, or wirelessly.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. The drawings may not necessarily be in scale so as to better present certain features of the illustrated subject matter.

DETAILED DESCRIPTION OF THE PREFERRED EMBODIMENTS

Overview

The present disclosure provides several pack/unpack methods for different kinds of signals transmitted in consumer electronics connection. Since bi-directional signal transmission of data is required between consumer electronics devices, at least two electrical signal channels are needed, each for one direction.

Many pins in consumer electronics connection are half-duplex. For example, the differential pair in USB 2.0, DDC, CEC in DVI and HDMI are half-duplex, while Ethernet signal of HEAC in HDMI 1.4a are full-duplex. Each of these signals needs to be separated into signals of two directions and transmitted in two signal channels of different directions.

Most, if not all, of the consumer electronics connections are compliant with one or more protocols such as USB, HDMI, etc. Each device embodies a standard physical layer (PHY). A PHY such as circuits are designed to convert all the signals, outputted from the device's PHY, to parallel data buses, clocks and other control signals. To transmit the signals economically, data buses, clocks and control signals transmitted in the same direction from different sources are packed together in one or more packets of a predefined format generated in accordance with embodiments of the present disclosure. The packets are transmitted by the same method as in optical communications. At the other end of the signal channels, the packets are recovered from the data stream by the same method as in optical communications. The original data buses, clocks and other control signals are unpacked from the packets. They are fed to PHY, such as circuits, at the other end to regenerate the signals in compliance with the one or more protocols. Accordingly, the entire system works like one copper cable.

When the bandwidth requirement in one direction is larger than what one channel can provide, extra signal channels can be added to this direction. The number of signal channels in both directions and the data rate of each channel can be the same although they do not need to be the same. The medium of the signal channel can be differential copper wires, optical fiber, or wireless. Differential copper wire may be suitable for applications of short distance, low cost and small connectors. Optical fiber may be suitable for applications of long distance.

Exemplary Conversion of HDMI 1.4a Signals to a Pair of Bi-Directional Signals

Figure 1:
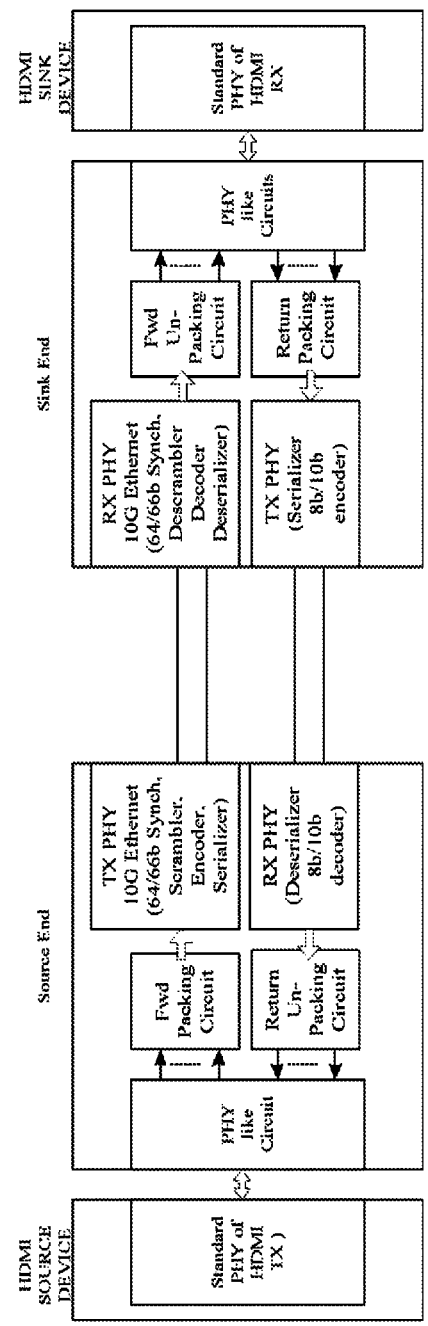
FIG. 1 is a system diagram of a HDMI or DVI converter in accordance with the present disclosure.

Referring to FIG. 1, a system according to the present disclosure contains a signal forward path from a HDMI source device to a HDMI sink device and a signal return path from the HDMI sink device to the HDMI source device. The source end is coupled to the HDMI source device and packs all the forward signals received from the HDMI source device into a high-speed forward data stream of one or more forward data packets. The source end also unpacks a return data stream received from the sink end into return control signals. The sink end is coupled to the HDMI sink device and unpacks the high-speed forward data stream received from the source end to all the forward signals. The sink end also packs the return control signals received from the sink device into a return data stream of one or more return data packets.

Figure 2:
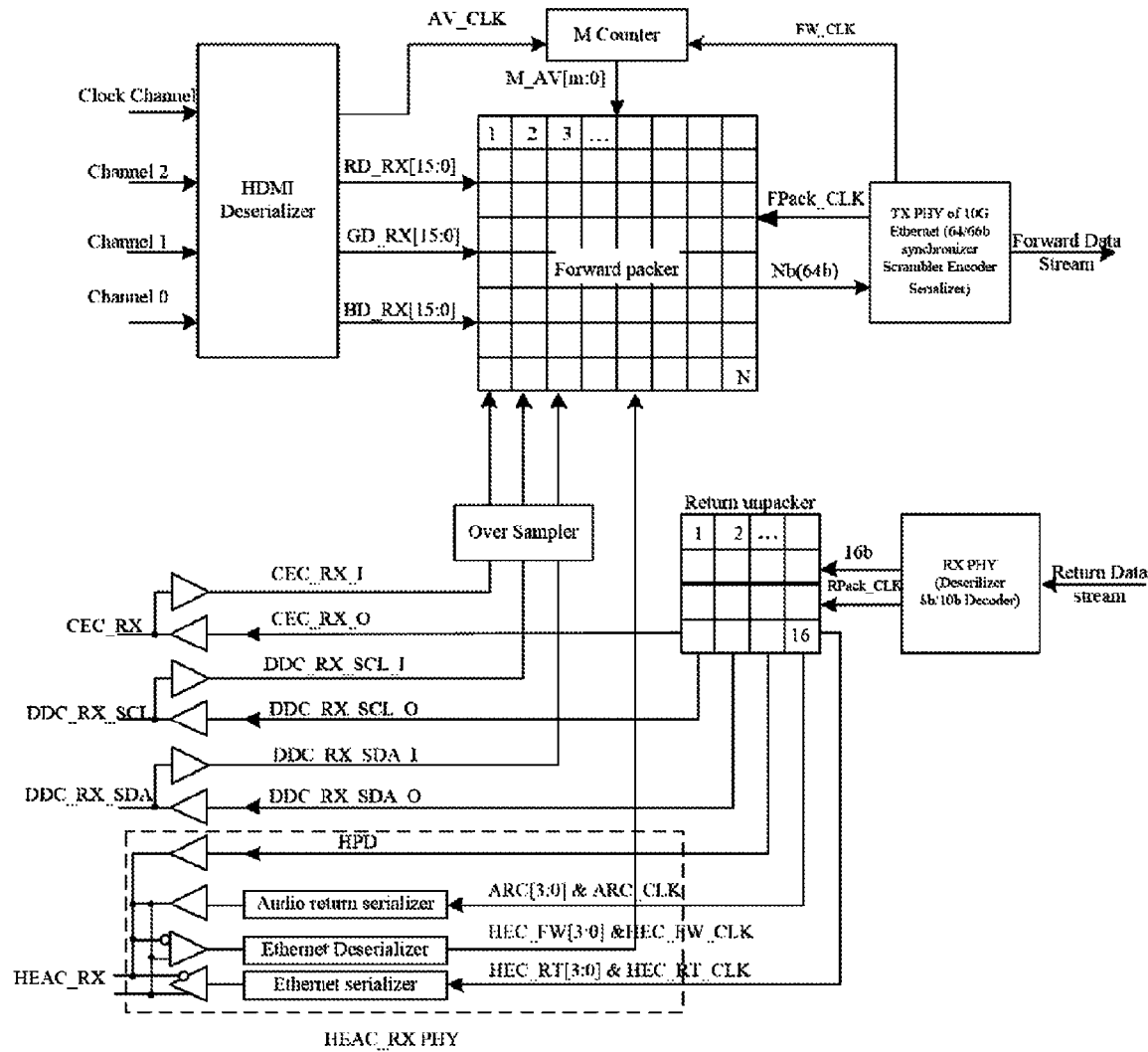
FIG. 2 is a block diagram of a source end coupled to a HDMI 1.4a source device in accordance with the present disclosure.

Referring to FIG. 2, a HDMI deserializer in the source end converts all the TMDS data and clock from the source device to 16*3 bits data bus (RD_RX[15:0], GD_RX[15:0], BD_RX[15:0]) and AV_CLK (clock of video and audio). To transmit the frequency information, or clock rate, of AV_CLK to the sink end accurately, a counter is used to generate a M_AV[m:0] code according to a ratio of the clock rate of AV_CLK and the clock rate of FW_CLK. FW_CLK is the same as the data rate of the forward data stream. The counter counts every rising/falling edge of AV_CLK at the interval of a predefined number cycle time of FW_CLK. In particular, M_AV[m:0]/Nc=f_AV_CLK/f_FW_CLK. Here, Nc is the predefined cycle number of FW_CLK, f_AV_CLK and f_FW_CLK represents the frequency of AV_CLK and FW_CLK.

The value of M_AV[m:0] is updated at every Nc number cycle time of FW_CLK. The M_AV[m:0] code is transmitted to the sink end in the forward data stream and used to regenerate the AV_CLK at the sink end. Bi-directional input/output (IO) separates forward signals from low-speed bi-directional signals. A HEAC_RX PHY is used to separate the forward Ethernet signal from the HEAC signal (HEAC_RX) from the HDMI source device. The data bus HEC_FW[3:0] and clock named HEC_FW_CLK are generated by a clock and data recovery (CDR) module in the HEAC_RX_PHY. To transmit the frequency information, or clock rate, of HEC_FW_CLK to the sink end accurately, a counter is used to generate a M_HEC_FW[m:0] code according to the ratio of the clock rate of HEC_FW_CLK and the clock rate of FW_CLK. CEC_RX_I is separated from CEC_RX. DDC_RX_SCL_I is separated from DDC_RX_SCL. DDC_RX_SDA_I is separated from DDC_RX_SDA.

Figure 3:
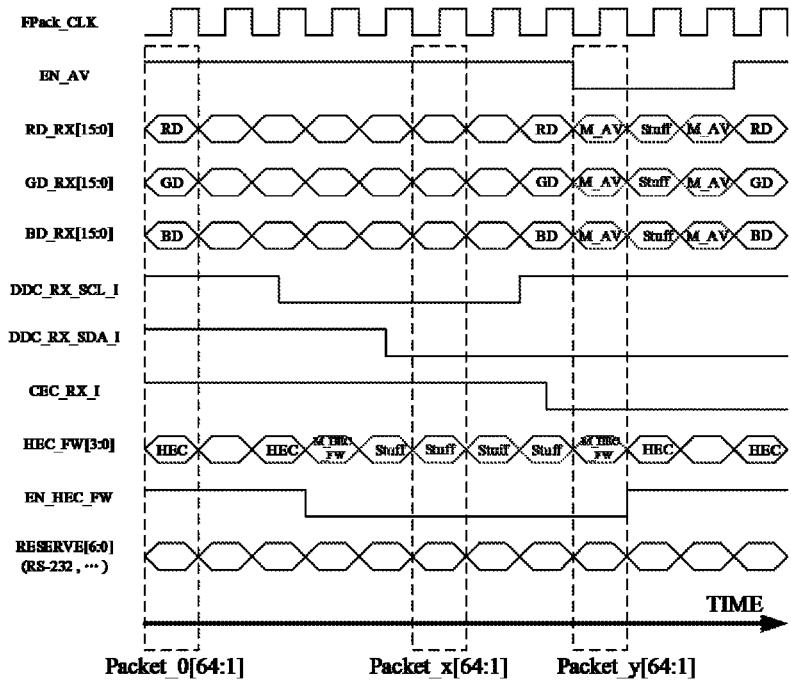
FIG. 3 shows a predefined packet format of a forward data stream in a HDMI 1.4a converter in accordance with the present disclosure.

To transmit these high/low-speed forward signals smoothly, large enough data rate is chosen for the forward data stream. If the forward data rate is 10 G bps, then the bandwidth of each bit in the 64-bit forward data packet is 10 G/66 (about 151M) bps. Referring to the FIGS. 2 and 3, the very low speed signals, such as CEC_RX_I, DDC_RX_SCL_I and DDC_RX_SDA_I, can be oversampled by a forward packing circuit clock (FPack_CLK) and fed into the forward packing circuit directly. The clock rate of FPack_CLK is higher than the respective clock rate of AV_CLK and HEC_FW_CLK, and so stuff bytes are needed when there are no data to send. Control signals EN_AV and EN_HEC_FW are added to the packet to mark the data and stuff bytes. When EN_AV, an internal signal of the forward packing circuit, is high, the transmitted data is placed on the data bus for transmission. When the EN_AV is low, the stuff byte is placed on the data bus for transmission. The M codes for AV_CLK and HEC_FW_CLK and corresponding control signals can be inserted into the stuff bytes. There are total 57 bits of signals in a forward data packet, with additional 7 bits being reserved. The reserved bits can be used to carry other signals not included in the specification of HDMI such as, for example, the forward signals of RS-232. Each of these 64 bits can be mapped to any bit of the forward data packet, because the forward unpacking circuit will recover all the data, signals and codes according to the predefined format. The packet format of FIG. 3 is for illustrative purpose. In various embodiments the size of the packet is not limited to 64 bits, the width of the data buses, location of the codes and signals can be traded off for efficient use of the bandwidth of the data stream. The forward data packets of the predefined format are serialized into the forward data stream by a transmitter PHY of 10 G Ethernet that may be commonly used in optical communication. 64b/66b synchronizer, scrambler, encoder and serializer are main function blocks of the source end data processor. The high-speed forward data stream is transferred by an optical channel or an electrical channel.

Figure 4:
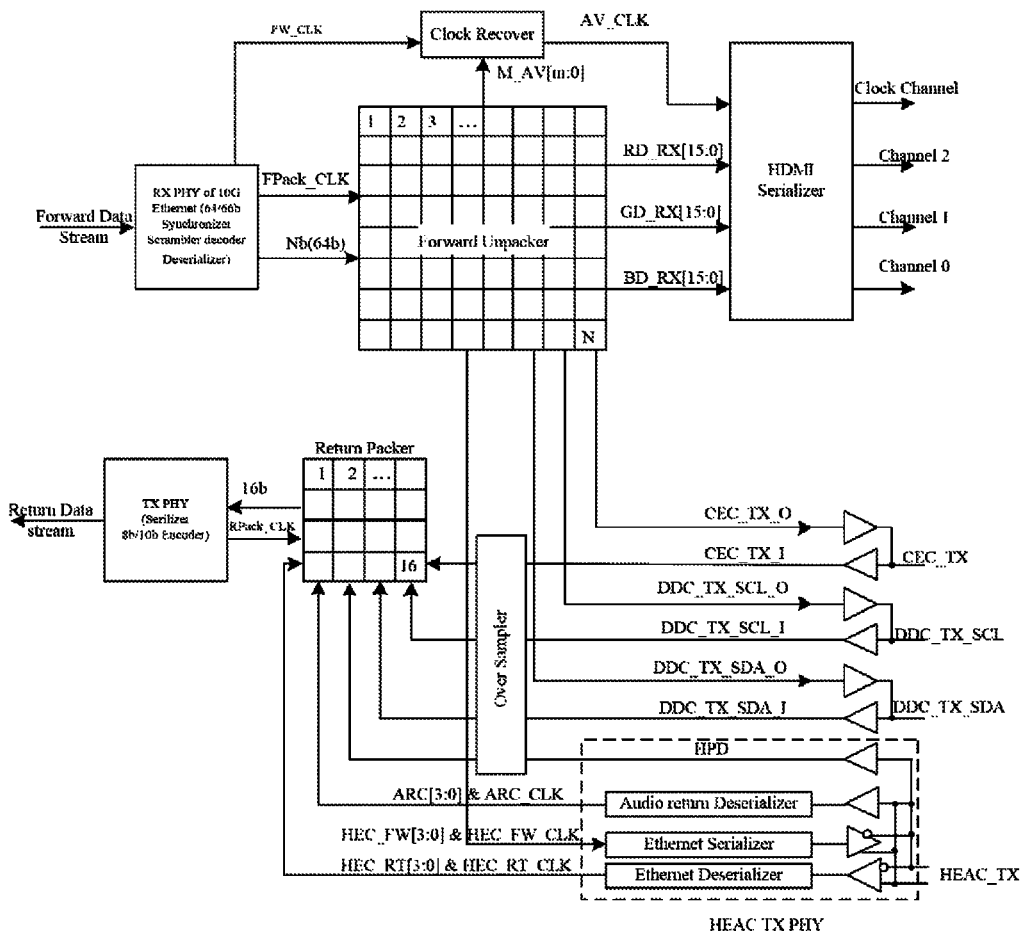
FIG. 4 is a block diagram of a sink end coupled to a HDMI 1.4a sink device in accordance with the present disclosure.

Referring to the FIG. 4, the forward data stream is deserialized to original packets by a receiver PHY of 10 G Ethernet that may be commonly used in optical communication. Deserializer, 64/66b decoder, descrambler and synchronizer are main function blocks of the sink end data processor. The forward unpacking circuit recovers all the data buses, clocks, and control signals. The 16*3 bits data bus (RD_RX [15:0], GD_RX [15:0], BD_RX [15:0]) are converted to TMDS data and clock by a HDMI serializer. The AV_CLK is derived from the M[m:0], predefined count interval (Nc number cycle time of FW_CLK) and FW_CLK by a clock recovery block. In particular, f_AV_CLK=M[m:0]/N*f_FW_CLK.

The three oversampled low-speed signals (DDC_RX_SCL_I, DDC_RX_CDA_I, CEC_RX_I) are renamed to DDC_TX_SCL_O, DDC_TX_SDA_O and CEC_TX_O at the sink end. Then DDC_TX_SCL_O, DDC_TX_SDA_O and CEC_TX_O are buffered to the HDMI control signal pins (DDC_TX_SCL, DDC_TX_SDA, CEC_TX) of the sink device. The data bus HEC_FW[3:0] and its clock HEC_FW_CLK are recovered from the forward data packet and converted to the original forward Ethernet signal by an Ethernet serializer. It is buffered to HEAC_TX pins of the sink device.

In the return path, CEC_TX_I is separated from CEC_TX; DDC_TX_SCL_I is separated from DDC_TX_SCL; DDC_TX_SDA_I is separated from DDC_TX_SDA; HPD, Audio return signals (ARC[3:0], ARC_CLK) and the return Ethernet signals (HEC_RT[3:0], HEC_CLK) are separated from the HEAC signal (HEAC_TX) from the HDMI sink device by a HEAC TX PHY.

Figure 5:
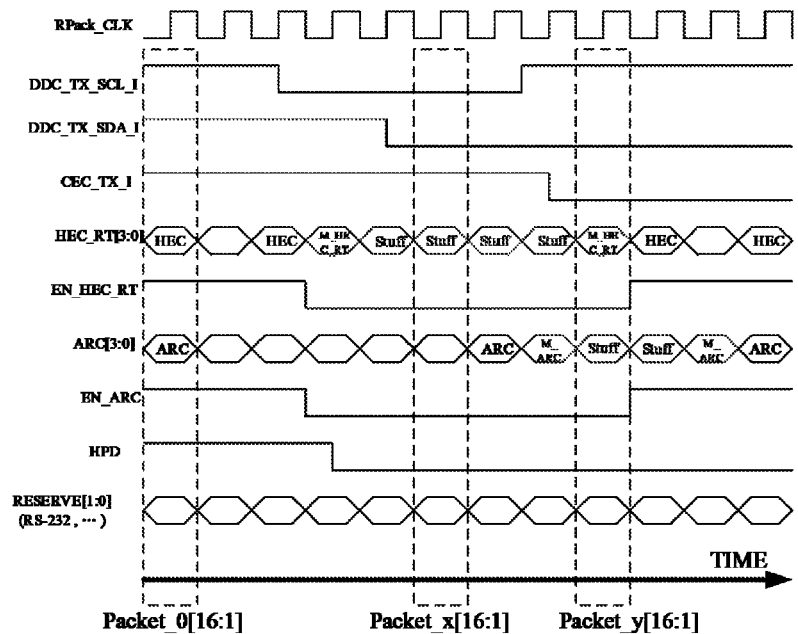
FIG. 5 shows a predefined packet format of a return data stream in a HDMI 1.4a converter in accordance with the present disclosure.
Figure 6:
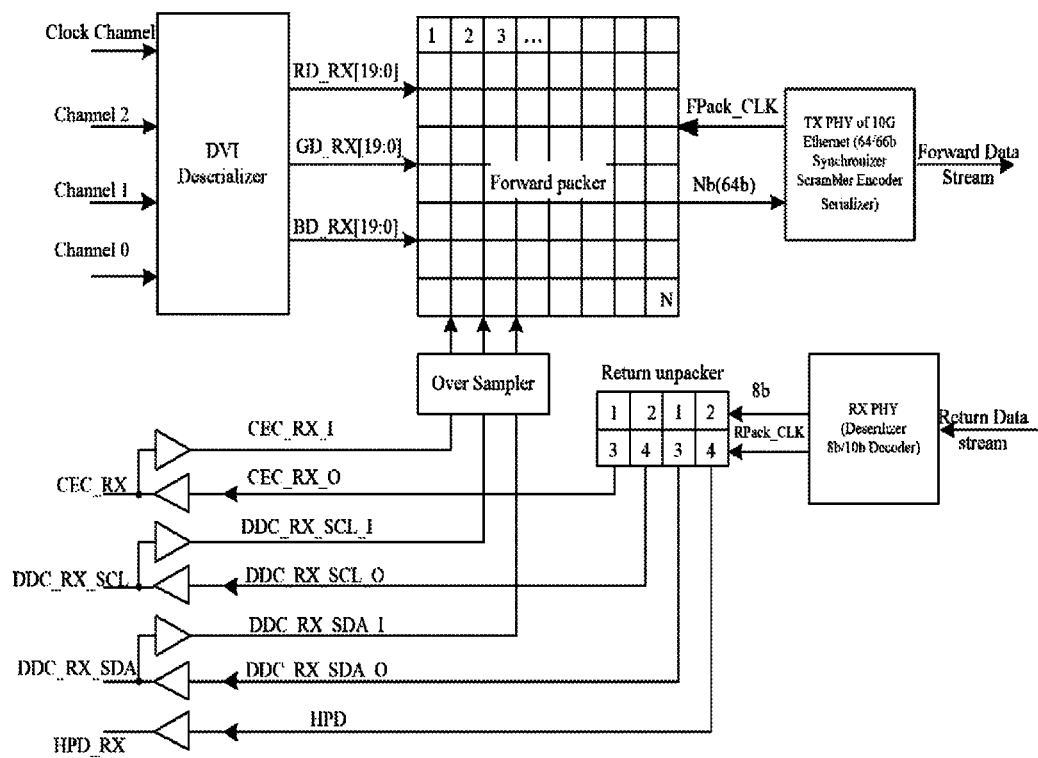
FIG. 6 is a block diagram of a source end coupled to a DVI source device in accordance with the present disclosure.
Figure 7:
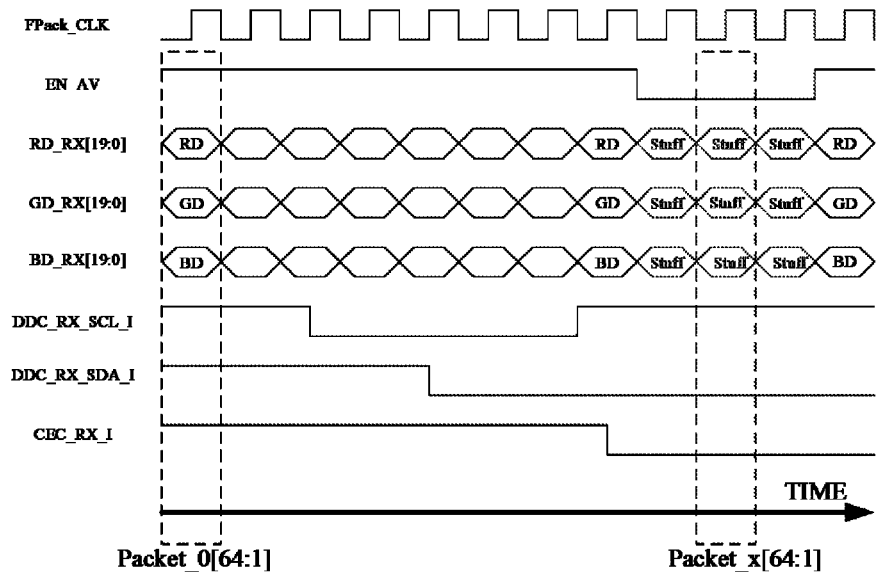
FIG. 7 shows a predefined packet format of a forward data stream of a DVI converter.

To transmit all the return signals smoothly, large enough data rate is chosen for the return data stream. If the return data rate is 1 G bps, then the bandwidth of each bit in the 16-bit return data packet is 1 G/20 (about 50M) bps. Referring to FIGS. 4 and 5, the very low speed signals such as CEC_TX_I, DDC_TX_SCL_I, DDC_TX_SDA_I and HPD can be oversampled by the return packing circuit clock (RPack_CLK) and fed into the return packing circuit directly. The frequency, or clock rate, of RPack_CLK is higher than the clock rates of ARC_CLK and HEC_RT_CLK, so stuff bytes are needed when there are no data to send. Control signals EN_ARC and EN_HEC_RT are added to the return data packet to mark the data and stuff byte. The M codes (M_ARC[m:0] and M_HEC_RT[m:0]) for ARC_CLK and HEC_RT_CLK and corresponding control signals can be inserted into the stuff bytes. There are totally 14 bits of signals in the return data packet, with additional 2 bits being reserved. The reserved bits can be used to transmit other signals not included in the specification of HDMI such as, for example, the return signal of RS-232. Each of these 16 bits can be mapped to any bit of the return data packet, because the return unpacking circuit will recover all the data, signals and codes according to the predefined format. The packet format of FIG. 5 is for illustrative purpose. The size of the return data packet is not limited to 16 bits, the width of the data buses, location of the codes and signals can be traded off for efficient use of the bandwidth of the data stream. The return data packets of the predefined format are serialized into the return data stream by a transmitter PHY that may be commonly used in SerDes (serializer/deserializer). The 8b/10b encoder and serializer are main function blocks of this source end data processor. The return data stream is transmitted by either an optical channel or an electrical channel.

Referring to FIG. 2, the return data stream is deserialized to original packets by a receiver PHY that may be commonly used in SerDes. Deserializer, 8b/10b decoder are main function blocks of this sink end data processor. The return unpacking circuit recovers all the data buses, clocks, and control signals. The over-sampled low-speed signals (DDC_TX_SCL_I, DDC_TX_CDA_I, CEC_TX_I) are renamed to DDC_RX_SCL_O, DDC_RX_SDA_O and CEC_RX_O at the source end. Then DDC_RX_SCL_O, DDC_RX_SDA_O and CEC_RX_O are buffered to the HDMI control signal pins (DDC_RX_SCL, DDC_RX_SDA, CEC_RX) of the source device. The data buses HEC_FE[3:0], ARC[3:0] and their clocks HEC_FW_CLK, ARC_CLK are recovered from the return data packet and converted to the original return Ethernet signal and audio return signal by their serializer. It is buffered to HEAC_TX pins of the sink device. The return Ethernet signal, audio return signal and another over-sampled signal HPD are buffered to HEAC_RX pins of the source device.

Exemplary Conversion of DVI Signals to a Pair of Bi-Directional Signals

The signal pins of DVI are similar to those of HDMI 1.4a. There is no HEAC channel in DVI. The HDMI protocol before the HDMI 1.4a also did not define the HEAC channel, so the system presented herein is also suitable to transmit signals of old versions of HDMI.

Referring to FIGS. 6-9, the main differences between conversion of DVI signals and conversion of HDMI 1.4a signals presented above are listed below.

1. HEAC Channel is removed.

Forward Ethernet signal, return Ethernet signal and audio return signal are not transmitted.

2. A simple and more bandwidth-efficient forward data packet is defined.

The DVI deserializer in the source end converts all the TMDS data from the source device to 20*3 bits data bus (RD_RX[19:0], GD_RX[19:0], BD_RX[19:0]). The same as for the conversion of HDMI 1.4a signals, EN_AV, CEC_RX_I, DDC_RX_SCL_I and DDC_RX_SDA_I are also added to the packet. There are 64 bits of signals total, and no bit is reserved. The M_AV[m:0] code is not transmitted because of a new method of clock recovery. The packet is much simpler but more efficient than that for HDMI 1.4a.

3. A simple and more bandwidth-efficient return data packet is defined.

There are only CEC_TX_I, DDC_TX_SCL_I, DDC_TX_SDA_I and HPD signals in the return path. A 4-bit packet is defined. There is also no bit reserved.

4. Another method is used to generated M_AV[m:0] code for clock recovery.

Figure 8:
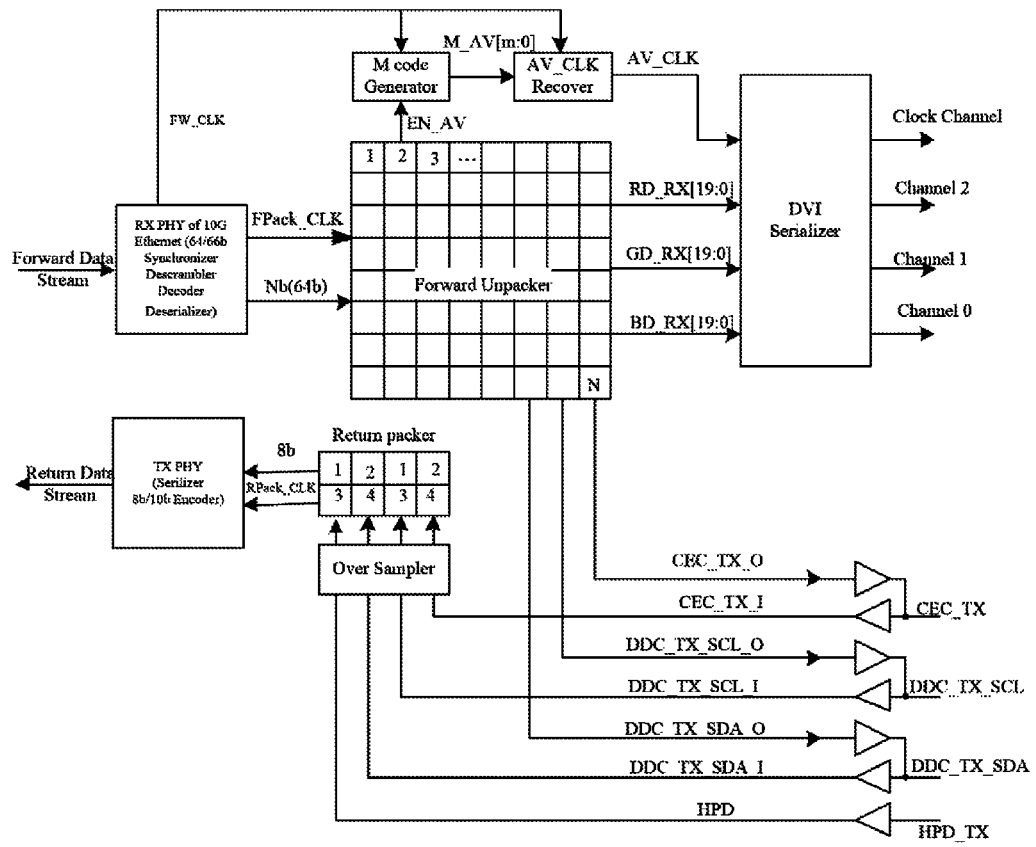
FIG. 8 is a block diagram of a sink end coupled to a DVI sink device in accordance with the present disclosure.
Figure 9:
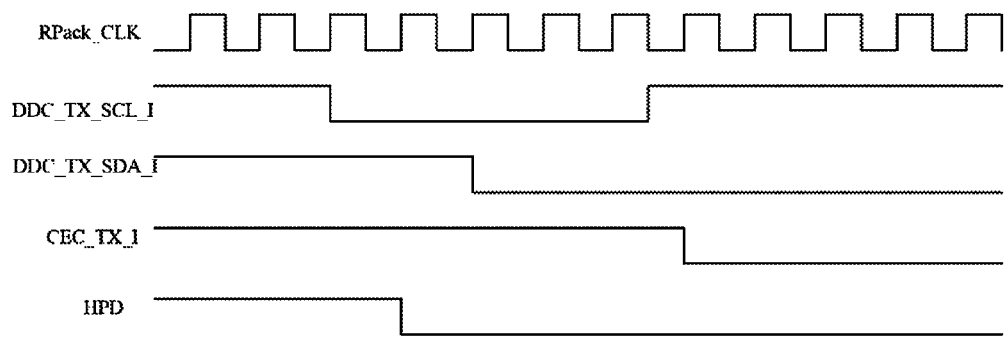
FIG. 9 shows a predefined packet format of a return data stream of a DV converter.

Referring to FIG. 8, the M_AV[m:0] code is generated at the sink side of the system. It is not necessary to transmit the M_AV[m:0] code through the data stream. The M_AV[m:0] code is generated by a counter, which runs when the EN_AV is high during the interval of a predefined number (Nc) of cycles of FW_CLK. Because the signal EN_AV is high only when TMDS data in the packet is not stuffed, the average value of M_AV[m:0] is the same as that generated at the source end. EN_AV is recovered from the forward data stream by the forward unpacking circuit.

Exemplary Conversion of USB 3.0 Signals to a Pair of Bi-Directional Signals

There are three pairs of differential copper wires in accordance with the USB3.0 standard. There may be circumstances where it is very valuable to convert the signals transmitted over the three pairs of differential copper wires to a pair of bi-directional signals. On the other hand, for long distance connection of USB3.0 by optical fibers conversion in accordance with the present disclosure may be preferred.

Figure 10:
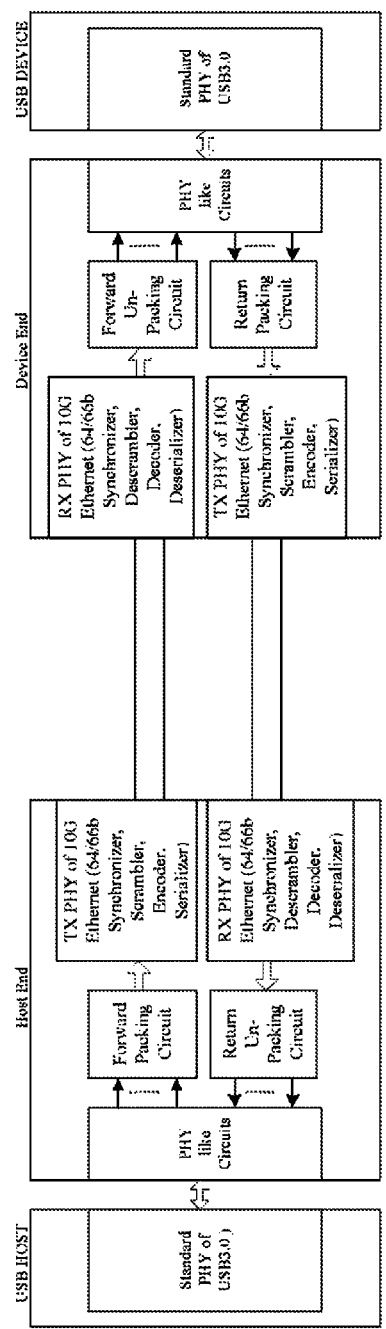
FIG. 10 is a system diagram of a USB 3.0 converter in accordance with the present disclosure.

Referring to FIG. 10, the whole system contains a signal forward path from a USB host to a USB device as well as a signal return path from the USB device to the USB host. The host end is coupled to the USB host, and packs all the forward signals from the USB host to a forward data stream. The host end also unpacks a return data stream received from the device end to all the return signals. The device end is coupled to the USB device, and unpacks the forward data stream from the host end to all the forward signals. The device end also packs all the return signals received from the device to a return data stream.

Figure 11:
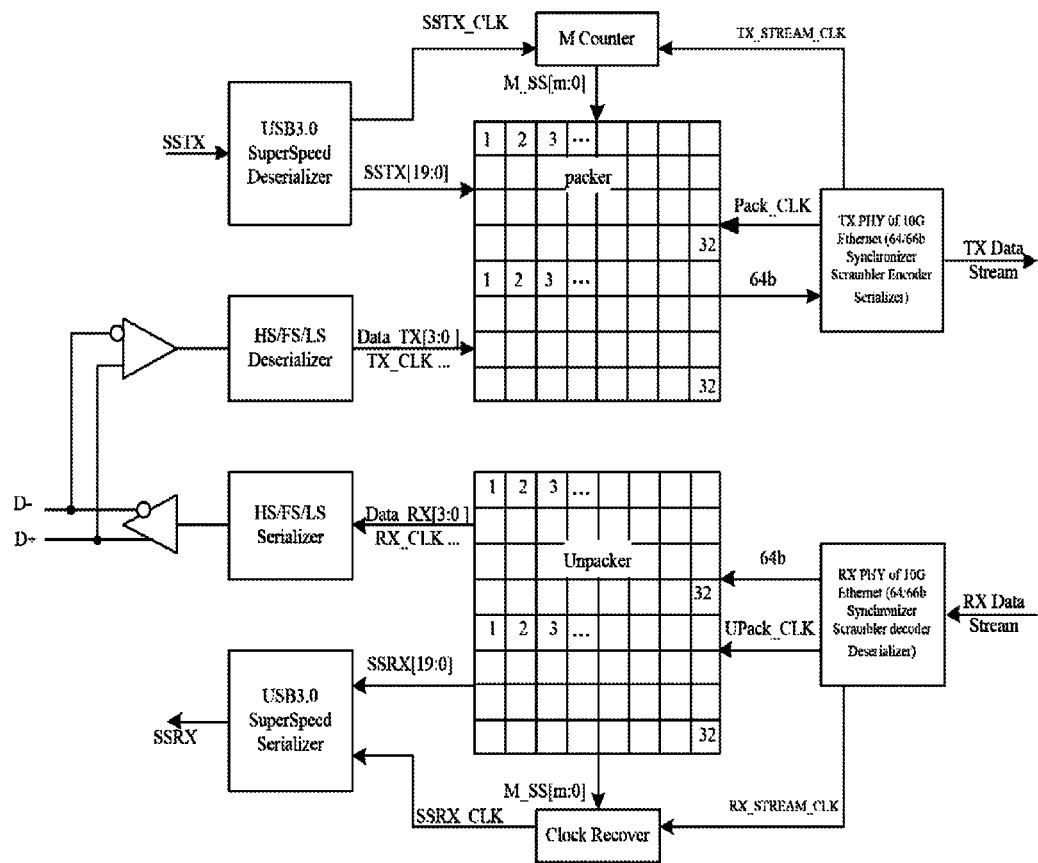
FIG. 11 is a block diagram of both source end and sink end coupled to a USB 3.0 host and device in accordance with the present disclosure.

As the forward and return signals are symmetrical in USB 3.0, the same design can be used on both ends. Referring to FIG. 11, the super speed transmitter channel signal (SSTX) is deserialized to 20 bits bus SSTX[19:0] and SSTX_CLK. The frequency information, or clock rate, of SSTX_CLK is convert to a M_SS[m:0] as with the HDMI 1.4a conversion. The USB 2.0 signal contained in the USB3.0 is bi-directional and half-duplex. The transmitter signal is separated from the differential cable and converted to a data bus Data_TX[3:0] and TX_CLK. The frequency information, or clock rate, of TX_CLK is also converted to another M_Data code. These M codes are transmitted in the stuff bytes as with the HDMI1.4a conversion.

Figure 12:
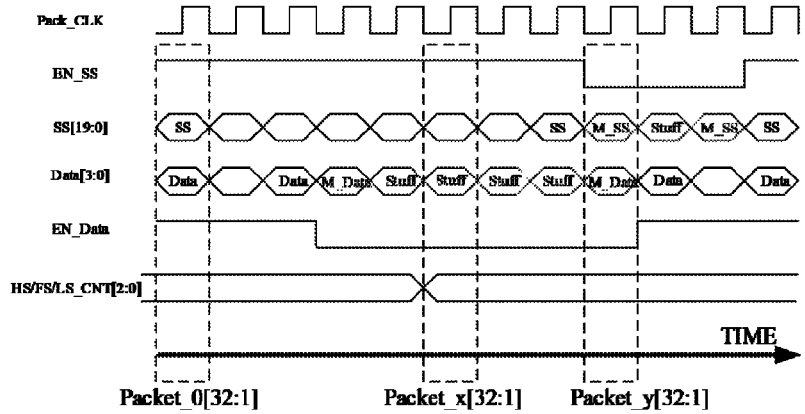
FIG. 12 shows a predefined packet format of a data stream of a USB 3.0 converter.

Referring to FIG. 12, a 32-bit packet is defined for TX/RX data stream. To transmit the high/low-speed forward signals smoothly, large enough data rate is chosen for the data stream. If the data rate is 10 G bps, then the bandwidth of each bit in the 32-bit forward packet is 10 G/33 (about 303M) bps. The frequency, or clock rate, of Pack_CLK is higher than the clock rates of SSTX_CLK and TX_CLK, so stuff bytes are needed when there are no data to send. Control signals EN_SS and EN_Data are added to the packet to mark the data and stuff bytes. There are three speed modes in USB2.0 signals, and three bits of control signals are added to the packets. There are total 29 bits of signals in the packet, with additional 3 bits that are reserved. Each of these 32 bits can be mapped to any bit of the packet, because the unpacking circuit will recover all the data, signals and codes according to a predefined format. Packets of the predefined format are serialized to TX data stream by a transmitter PHY of 10 G Ethernet that may be commonly used in optical communication. The TX data stream is transmitted by either an optical channel or an electrical channel.

The TX data stream is deserialized to original packets by a receiver PHY of 10 G Ethernet that may be commonly used in optical communication. The unpacking circuit recovers all the data buses, clocks, and control signals. The 20 bits data bus (SSRX[19:0]) is converted to SSRX signal by a USB super speed serializer. The SSRX_CLK is derived from the M code as with the HDMI 1.4a conversion. The USB 2.0 signals Data_RX[3:0], clock and corresponding control signals are serialized by HS/FS/LS serializer and buffered to the USB2.0 differential pair.

Exemplary Processes

Figure 13:
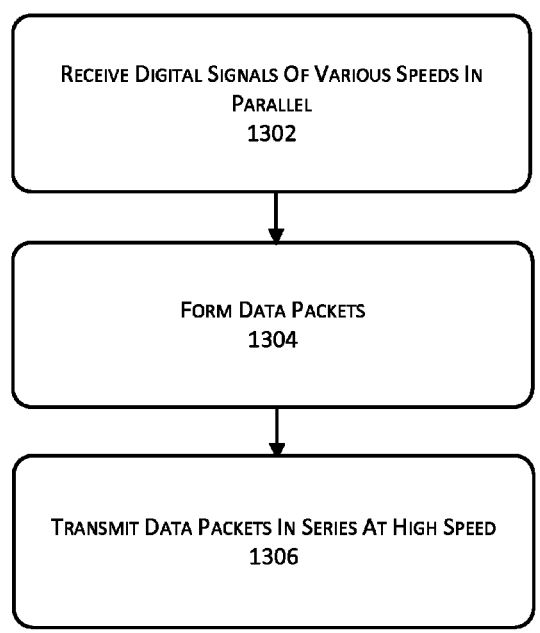
FIG. 13 is a flowchart of a process of signal conversion method in accordance with the present disclosure.

FIG. 13 shows a processing flow 1300 in accordance with one or more embodiments of a signal conversion method.

Example processing flow 1300 includes one or more operations, actions, or functions as illustrated by one or more of blocks 1302, 1304 and 1306. Although illustrated as discrete blocks, various blocks may be divided into additional blocks, combined into fewer blocks, or eliminated, depending on the desired implementation. Further, processing flow 1300 may be implemented in one or more of the systems and devices shown in FIGS. 1, 2, 4, 6, 10 and 11. Processing flow 1300 may begin at block 1302.

Block 1302 (Receive Digital Signals Of Various Speeds In Parallel) includes receiving, in parallel, a first plurality of digital signals at a first clock rate and a second plurality of digital signals at a second clock rate which is slower than the first clock rate.

Block 1304 (Form Data Packets) includes forming one or more forward data packets in a predefined format based at least in part on the first plurality and the second plurality of digital signals.

Block 1306 (Transmit Data Packets In Series At High Speed) includes transmitting, in series, the one or more forward data packets at a third clock rate which is faster than the first clock rate.

In one embodiment, forming one or more forward data packets in a predefined format based at least in part on the first plurality and the second plurality of digital signals may comprise: deserializing the first plurality of digital signals; generating digital codes according to a frequency ratio of the first clock rate and the third clock rate; oversampling the second plurality of digital signals; packing the deserialized first plurality of digital signals, digital codes of the first clock rate, and the oversampled second plurality of digital signals into the one or more forward data packets in the predefined format; and serializing the one or more forward data packets.

In one embodiment, forming one or more forward data packets in a predefined format based at least in part on the first plurality and the second plurality of digital signals may comprise: deserializing the first plurality of digital signals; generating digital codes according to a frequency ratio of the first clock rate and the third clock rate; deserializing the second plurality of digital signals; generating digital codes according to a frequency ratio of the second clock rate and the third clock rate; packing the deserialized first plurality of digital signals, the deserialized second plurality of digital signals, and digital codes of the first, second and third clock rates into the one or more forward data packets in the predefined format; and serializing the one or more forward data packets.

In one embodiment, transmitting one or more forward data packets may comprise transmitting the one or more forward data packets over one or more fiber optic channels, over one or more copper wires, or wirelessly.

In one embodiment, the first plurality of digital signals and the second plurality of digital signals may be based on one or more of the HDMI (e.g., HDMI 1.4a) standard, the DVI standard, the RS-232 standards, and the USB (e.g., USB 3.0) standard.

In one embodiment, the method may further comprise: receiving, in series, one or more return data packets at a fourth clock rate; and converting the one or more return data packets into a fourth plurality of digital signals at the second clock rate which is slower than the fourth clock rate.

In one embodiment, at least some of the fourth plurality of digital signals may comprise the second plurality of digital signals.

Figure 14:
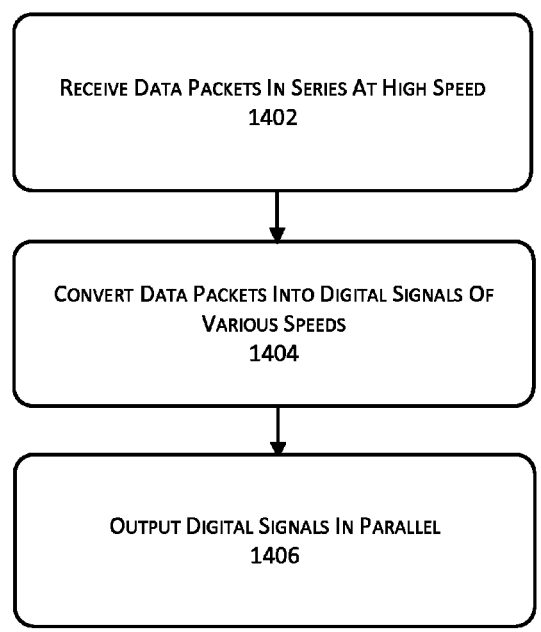
FIG. 14 is a flowchart of another process of signal conversion method in accordance with the present disclosure.

FIG. 14 shows a processing flow 1400 in accordance with one or more embodiments of a signal conversion method.

Example processing flow 1400 includes one or more operations, actions, or functions as illustrated by one or more of blocks 1402, 1404 and 1406. Although illustrated as discrete blocks, various blocks may be divided into additional blocks, combined into fewer blocks, or eliminated, depending on the desired implementation. Further, processing flow 1400 may be implemented in one or more of the systems and devices shown in FIGS. 1, 2, 4, 6, 10 and 11. Processing flow 1400 may begin at block 1402.

Block 1402 (Receive Data Packets In Series At High Speed) includes receiving, in series, one or more forward data packets that are in a predefined format at a third clock rate.

Block 1404 (Convert Data Packets Into Digital Signals Of Various Speeds) includes converting the one or more forward data packets into a first plurality of digital signals at a first clock rate that is slower than the third clock rate and a second plurality of digital signals at a second clock rate that is slower than the first clock rate.

Block 1406 (Output Digital Signals In Parallel) includes outputting, in parallel, the first plurality of digital signals and the second plurality of digital signals.

In one embodiment, converting the one or more forward data packets into a first plurality of digital signals at a first clock rate that is slower than the third clock rate and a second plurality of digital signals at a second clock rate that is slower than the first clock rate may comprise: deserializing the one or more forward data packets; unpacking the deserialized one or more forward data packets into the first plurality of digital signals, digital codes of the first clock rate, and the second plurality of digital signals; generating digital codes according to a number of bytes of the first plurality of digital signals received during an interval of a predefined number of cycles of a clock according to the third clock rate; recovering the first clock rate with either the generated digital codes and the third clock rate or the digital codes of the first clock rate unpacked from the deserialized one or more forward data packets; and serializing the first plurality of digital signals.

In one embodiment, converting the one or more forward data packets into a first plurality of digital signals at a first clock rate that is slower than the third clock rate and a second plurality of digital signals at a second clock rate that is slower than the first clock rate may comprise: deserializing the one or more forward data packets; unpacking the deserialized one or more forward data packets into the first plurality of digital signals, the second plurality of digital signals, and digital codes of the first clock rate and the second clock rate; generating first digital codes according to a number of bytes of the first plurality of digital signals received during an interval of a predefined number of cycles of a clock according to the third clock rate; recovering the first clock rate with either the generated first digital codes and the third clock rate or the digital codes of the first clock rate unpacked from the deserialized one or more forward data packets; generating second digital codes according to a number of bytes of the second plurality of digital signals received during an interval of the predefined number of cycles of the clock according to the third clock rate; recovering the second clock rate with either the generated second digital codes and the third clock rate or the digital codes of the second clock rate unpacked from the deserialized one or more forward data packets; serializing the first plurality of digital signals; and serializing the second plurality of digital signals.

In one embodiment, receiving one or more forward data packets may comprise receiving the one or more forward data packets over one or more fiber optic channels, over one or more copper wires, or wirelessly.

In one embodiment, the first plurality of digital signals and the second plurality of digital signals may be based on one or more of the HDMI (e.g., HDMI 1.4a) standard, the DVI standard, the RS-232 standards, and the USB (e.g., USB 3.0) standard.

In one embodiment, the method may further comprise: receiving a fourth plurality of digital signals at the second clock rate; packing the fourth plurality of digital signals into one or more return data packets by oversampling at least some of the fourth plurality of digital signals; and transmitting, in series, the one or more return data packets at a fourth clock rate which is faster than the second clock rate.

In one embodiment, at least some of the fourth plurality of digital signals may comprise the second plurality of digital signals.

Exemplary Devices

Features of an exemplary signal conversion device on the source end of FIGS. 1, 2, 6, 10 and 11 are described below.

According to one aspect, a signal conversion device may comprise a forward packing circuit configured to: (1) receive, in parallel, a first plurality of digital signals at a first clock rate and a second plurality of digital signals at a second clock rate that is slower than the first clock rate, and (2) pack the first plurality of digital signals and the second plurality of digital signals into one or more forward data packets having a predefined format and a third clock rate that is faster than the first clock rate. The signal conversion device may additionally comprise a return unpacking circuit configured to: (1) receive one or more return data packets at a fourth clock rate, and (2) unpack the one or more return data packets into at least a fourth plurality of digital signals at the second clock rate which is slower than the fourth clock rate.

In one embodiment, the first plurality of digital signals and the second plurality of digital signals may be based on one or more of the HDMI (e.g., HDMI 1.4a) standard, the DVI standard, the RS-232 standards, and the USB (e.g., USB 3.0) standard.

In one embodiment, the signal conversion device may further comprise an oversampler that receives the second plurality of digital signals in parallel at the second clock, oversamples the second plurality of digital signals, and outputs the oversampled second plurality of digital signals to the forward packing circuit.

In one embodiment, the signal conversion device may additionally comprise a forward deserializer that receives the first plurality of digital signals in parallel at the first clock rate, deserializes the first plurality of digital signals, and outputs a first plurality of deserialized digital signals to the forward packing circuit. The signal conversion device may further comprise a forward serializer that receives the one or more forward data packets from the forward packing circuit, and serializes and transmits the one or more forward data packets in series at a third clock rate which is faster than the first clock rate.

In one embodiment, the forward packing circuit may pack the first plurality of digital signals and the second plurality of digital signals into the one or more forward data packets by: generating digital codes according to a frequency ratio of the first clock rate and the third clock rate; and packing the deserialized first plurality of digital signals, digital codes of the first clock rate, and the oversampled second plurality of digital signals into the one or more forward data packets in the predefined format.

In one embodiment, the forward deserializer may further receive the second plurality of digital signals in parallel at the second clock rate, deserialize the second plurality of digital signals, and output a second plurality of deserialized digital signals to the forward packing circuit. The forward packing circuit may pack the first plurality of digital signals and the second plurality of digital signals into the one or more forward data packets by: generating digital codes according to a frequency ratio of the first clock rate and the third clock rate; generating digital codes according to a frequency ratio of the second clock rate and the third clock rate; and packing the deserialized first plurality of digital signals, the deserialized second plurality of digital signals, and digital codes of the first, second and third clock rates into the one or more forward data packets in the predefined format.

In one embodiment, the forward serializer may transmit the one or more forward data packets over one or more fiber optic channels, over one or more copper wires, or wirelessly.

In one embodiment, the signal conversion device may further comprise a return deserializer that receives, in series, one or more return data packets at a fourth clock rate, deserializes the one or more return data packets, and outputs the deserialized one or more return data packets to the return unpacking circuit.

Features of an exemplary signal conversion device on the sink end of FIGS. 1, 4, 8, 10 and 11 are described below.

According to another aspect, a signal conversion device may comprise a forward unpacking circuit configured to: (1) receive one or more forward data packets that are in a predefined format at a third clock rate, (2) unpack the one or more forward data packets into a first plurality of digital signals at a first clock rate that is slower than the third clock rate and a second plurality of digital signals at a second clock rate that is slower than the first clock rate. The signal conversion device may additionally comprise a return packing circuit configured to: (1) receive a fourth plurality of digital signals at the second clock rate, and (2) pack the fourth plurality of digital signals into one or more return data packets having a predefined format and a fourth clock rate that is faster than the second clock rate.

In one embodiment, the first plurality of digital signals and the second plurality of digital signals may be based on one or more of the HDMI (e.g., HDMI 1.4a) standard, the DVI standard, the RS-232 standards, and the USB (e.g., USB 3.0) standard.

In one embodiment, the signal conversion device may further comprise an oversampler that receives the fourth plurality of digital signals in parallel at the second clock, oversamples the fourth plurality of digital signals, and outputs the oversampled fourth plurality of digital signals to the return packing circuit.

In one embodiment, the signal conversion device may additionally comprise a forward deserializer that receives the one or more forward data packets in series at the third clock rate, deserializes the one or more forward data packets, and outputs the deserialized one or more forward data packets to the forward unpacking circuit. The signal conversion device may further comprise a forward serializer that receives the first plurality of digital signals from the forward unpacking circuit, serializes the first plurality of digital signals, and outputs the serialized first plurality of digital signals at the first clock rate.

In one embodiment, the forward unpacking circuit may unpack the one or more forward data packets into the first plurality of digital signals and the second plurality of digital signals by: unpacking the deserialized one or more forward data packets into the first plurality of digital signals, digital codes of the first clock rate, and the second plurality of digital signals; generating digital codes according to a number of bytes of the first plurality of digital signals received during an interval of a predefined number of cycles of a clock according to the third clock rate; and recovering the first clock rate with either the generated digital codes and the third clock rate or the digital codes of the first clock rate unpacked from the deserialized one or more forward data packets.

In one embodiment, the forward unpacking circuit may unpack the one or more forward data packets into the first plurality of digital signals and the second plurality of digital signals by: unpacking the deserialized one or more forward data packets into the first plurality of digital signals, the second plurality of digital signals, and digital codes of the first clock rate and the second clock rate; generating first digital codes according to a number of bytes of the first plurality of digital signals received during an interval of a predefined number of cycles of a clock according to the third clock rate; recovering the first clock rate with either the generated first digital codes and the third clock rate or the digital codes of the first clock rate unpacked from the deserialized one or more forward data packets; generating second digital codes according to a number of bytes of the second plurality of digital signals received during an interval of the predefined number of cycles of the clock according to the third clock rate; and recovering the second clock rate with either the generated second digital codes and the third clock rate or the digital codes of the second clock rate unpacked from the deserialized one or more forward data packets.

In one embodiment, the signal conversion device may further comprise a return serializer that receives the one or more return data packets from the return packing circuit, serializes the one or more return data packets, and transmits the serialized one or more return data packets at the fourth clock rate.

In one embodiment, the return serializer may transmit the serialized one or more return data packets over one or more fiber optic channels, over one or more copper wires, or wirelessly.

Additional Note

Although some embodiments are disclosed above, they are not intended to limit the scope of the present disclosure. It will be apparent to those skilled in the art that various modifications and variations can be made to the disclosed embodiments of the present disclosure without departing from the scope or spirit of the present disclosure. In view of the foregoing, the scope of the present disclosure shall be defined by the following claims and their equivalents.

What is claimed is:

1. A signal conversion method, comprising:
receiving, in parallel, a first plurality of digital signals at a first clock rate and a second plurality of digital signals at a second clock rate which is slower than the first clock rate;
forming one or more forward data packets in a predefined format based at least in part on the first plurality and the second plurality of digital signals; and
transmitting, in series, the one or more forward data packets at a third clock rate which is faster than the first clock rate,
wherein forming one or more forward data packets in a predefined format based at least in part on the first plurality and the second plurality of digital signals comprises:
deserializing the first plurality of digital signals;
generating digital codes according to a frequency ratio of the first clock rate and the third clock rate;
oversampling the second plurality of digital signals;
packing the deserialized first plurality of digital signals, digital codes of the first clock rate, and the oversampled second plurality of digital signals into the one or more forward data packets in the predefined format; and
serializing the one or more forward data packets.

2. The method as recited in claim 1, wherein forming one or more forward data packets in a predefined format based at least in part on the first plurality and the second plurality of digital signals comprises, alternatively:
deserializing the first plurality of digital signals;
generating digital codes according to a frequency ratio of the first clock rate and the third clock rate;
deserializing the second plurality of digital signals;
generating digital codes according to a frequency ratio of the second clock rate and the third clock rate;
packing the deserialized first plurality of digital signals, the deserialized second plurality of digital signals, and digital codes of the first, second and third clock rates into the one or more forward data packets in the predefined format; and
serializing the one or more forward data packets.

3. The method as recited in claim 1, wherein transmitting one or more forward data packets comprises transmitting the one or more forward data packets over one or more fiber optic channels, over one or more copper wires, or wirelessly.

4. The method as recited in claim 1, wherein the first plurality of digital signals and the second plurality of digital signals are based on one or more of the High-Definition Multimedia Interface (HDMI) standard, the Digital Video Interface (DVI) standard, the RS-232 standards, and the Universal Serial Bus (USB) standard.

5. The method as recited in claim 1, further comprising:
receiving, in series, one or more return data packets at a fourth clock rate; and
converting the one or more return data packets into a fourth plurality of digital signals at the second clock rate which is slower than the fourth clock rate.

6. The method as recited in claim 5, wherein at least some of the fourth plurality of digital signals comprise the second plurality of digital signals.

7. A signal conversion method, comprising:
receiving, in series, one or more forward data packets that are in a predefined format at a third clock rate;
converting the one or more forward data packets into a first plurality of digital signals at a first clock rate that is slower than the third clock rate and a second plurality of digital signals at a second clock rate that is slower than the first clock rate; and
outputting, in parallel, the first plurality of digital signals and the second plurality of digital signals,
wherein converting the one or more forward data packets into a first plurality of digital signals at a first clock rate that is slower than the third clock rate and a second plurality of digital signals at a second clock rate that is slower than the first clock rate comprises:
- deserializing the one or more forward data packets;
- unpacking the deserialized one or more forward data packets into the first plurality of digital signals, the second plurality of digital signals, and digital codes of the first clock rate and the second clock rate;
- generating first digital codes according to a number of bytes of the first plurality of digital signals received during an interval of a predefined number of cycles of a clock according to the third clock rate;
- recovering the first clock rate with either the generated first digital codes and the third clock rate or the digital codes of the first clock rate unpacked from the deserialized one or more forward data packets;
- generating second digital codes according to a number of bytes of the second plurality of digital signals received during an interval of the predefined number of cycles of the clock according to the third clock rate;
- recovering the second clock rate with either the generated second digital codes and the third clock rate or the digital codes of the second clock rate unpacked from the deserialized one or more forward data packets;
- serializing the first plurality of digital signals; and
- serializing the second plurality of digital signals.

8. The method as recited in claim 7, wherein converting the one or more forward data packets into a first plurality of digital signals at a first clock rate that is slower than the third clock rate and a second plurality of digital signals at a second clock rate that is slower than the first clock rate comprises, alternatively:
- deserializing the one or more forward data packets;
- unpacking the deserialized one or more forward data packets into the first plurality of digital signals, digital codes of the first clock rate, and the second plurality of digital signals;
- generating digital codes according to a number of bytes of the first plurality of digital signals received during an interval of a predefined number of cycles of a clock according to the third clock rate;
- recovering the first clock rate with either the generated digital codes and the third clock rate or the digital codes of the first clock rate unpacked from the deserialized one or more forward data packets; and
- serializing the first plurality of digital signals.

9. The method as recited in claim 7, wherein receiving one or more forward data packets comprises receiving the one or more forward data packets over one or more fiber optic channels, over one or more copper wires, or wirelessly.

10. The method as recited in claim 7, wherein the first plurality of digital signals and the second plurality of digital signals are based on one or more of the High-Definition Multimedia Interface (HDMI) standard, the Digital Video Interface (DVI) standard, the RS-232 standards, and the Universal Serial Bus (USB) standard.

11. The method as recited in claim 7, further comprising:
- receiving a fourth plurality of digital signals at the second clock rate;
- packing the fourth plurality of digital signals into one or more return data packets by oversampling at least some of the fourth plurality of digital signals; and
- transmitting, in series, the one or more return data packets at a fourth clock rate which is faster than the second clock rate.

12. The method as recited in claim 11, wherein at least some of the fourth plurality of digital signals comprise the second plurality of digital signals.

13. A signal conversion device, comprising:
- a forward packing circuit configured to:
  - receive, in parallel, a first plurality of digital signals at a first clock rate and a second plurality of digital signals at a second clock rate that is slower than the first clock rate, and
  - pack the first plurality of digital signals and the second plurality of digital signals into one or more forward data packets having a predefined format and a third clock rate that is faster than the first clock rate;
- a return unpacking circuit configured to:
  - receive one or more return data packets at a fourth clock rate, and
  - unpack the one or more return data packets into at least a fourth plurality of digital signals at the second clock rate which is slower than the fourth clock rate;
- an oversampler that receives the second plurality of digital signals in parallel at the second clock, oversamples the second plurality of digital signals, and outputs the oversampled second plurality of digital signals to the forward packing circuit;
- a forward deserializer that receives the first plurality of digital signals in parallel at the first clock rate, deserializes the first plurality of digital signals, and outputs a first plurality of deserialized digital signals to the forward packing circuit; and
- a forward serializer that receives the one or more forward data packets from the forward packing circuit, and serializes and transmits the one or more forward data packets in series at a third clock rate which is faster than the first clock rate,
- wherein the forward packing circuit packs the first plurality of digital signals and the second plurality of digital signals into the one or more forward data packets by:
  - generating digital codes according to a frequency ratio of the first clock rate and the third clock rate; and
  - packing the deserialized first plurality of digital signals, digital codes of the first clock rate, and the oversampled second plurality of digital signals into the one or more forward data packets in the predefined format.

14. The signal conversion device as recited in claim 13, wherein the first plurality of digital signals and the second plurality of digital signals are based on one or more of the High-Definition Multimedia Interface (HDMI) standard, the Digital Video Interface (DVI) standard, the RS-232 standards, and the Universal Serial Bus (USB) standard.

15. The signal conversion device as recited in claim 13, wherein the forward deserializer further receives the second plurality of digital signals in parallel at the second clock rate, deserializes the second plurality of digital signals, and outputs a second plurality of deserialized digital signals to the forward packing circuit, and wherein the forward packing circuit packs the first plurality of digital signals and the second plurality of digital signals into the one or more forward data packets by:
- generating digital codes according to a frequency ratio of the first clock rate and the third clock rate;
- generating digital codes according to a frequency ratio of the second clock rate and the third clock rate; and
- packing the deserialized first plurality of digital signals, the deserialized second plurality of digital signals, and digital codes of the first, second and third clock rates into the one or more forward data packets in the predefined format.

16. The signal conversion device as recited in claim 13, wherein the forward serializer transmits the one or more forward data packets over one or more fiber optic channels, over one or more copper wires, or wirelessly.

17. The signal conversion device as recited in claim 13, further comprising:
a return deserializer that receives, in series, one or more return data packets at a fourth clock rate, deserializes the one or more return data packets, and outputs the deserialized one or more return data packets to the return unpacking circuit.

18. A signal conversion device, comprising:
a forward unpacking circuit configured to:
   receive one or more forward data packets that are in a predefined format at a third clock rate, and
   unpack the one or more forward data packets into a first plurality of digital signals at a first clock rate that is slower than the third clock rate and a second plurality of digital signals at a second clock rate that is slower than the first clock rate;
a return packing circuit configured to:
   receive a fourth plurality of digital signals at the second clock rate, and
   pack the fourth plurality of digital signals into one or more return data packets having a predefined format and a fourth clock rate that is faster than the second clock rate;
a forward deserializer that receives the one or more forward data packets in series at the third clock rate, deserializes the one or more forward data packets, and outputs the deserialized one or more forward data packets to the forward unpacking circuit; and
a forward serializer that receives the first plurality of digital signals from the forward unpacking circuit, serializes the first plurality of digital signals, and outputs the serialized first plurality of digital signals at the first clock rate,
wherein the forward unpacking circuit unpacks the one or more forward data packets into the first plurality of digital signals and the second plurality of digital signals by:
   unpacking the deserialized one or more forward data packets into the first plurality of digital signals, digital codes of the first clock rate, and the second plurality of digital signals;
   generating digital codes according to a number of bytes of the first plurality of digital signals received during an interval of a predefined number of cycles of a clock according to the third clock rate; and
   recovering the first clock rate with either the generated digital codes and the third clock rate or the digital codes of the first clock rate unpacked from the deserialized one or more forward data packets.

19. The signal conversion device as recited in claim 18, wherein the first plurality of digital signals and the second plurality of digital signals are based on one or more of the High-Definition Multimedia Interface (HDMI) standard, the Digital Video Interface (DVI) standard, the RS-232 standards, and the Universal Serial Bus (USB) standard.

20. The signal conversion device as recited in claim 18, further comprising:
an oversampler that receives the fourth plurality of digital signals in parallel at the second clock, oversamples the fourth plurality of digital signals, and outputs the oversampled fourth plurality of digital signals to the return packing circuit.

21. The signal conversion device as recited in claim 18, wherein the forward unpacking circuit unpacks the one or more forward data packets into the first plurality of digital signals and the second plurality of digital signals by, alternatively:
   unpacking the deserialized one or more forward data packets into the first plurality of digital signals, the second plurality of digital signals, and digital codes of the first clock rate and the second clock rate;
   generating first digital codes according to a number of bytes of the first plurality of digital signals received during an interval of a predefined number of cycles of a clock according to the third clock rate;
   recovering the first clock rate with either the generated first digital codes and the third clock rate or the digital codes of the first clock rate unpacked from the deserialized one or more forward data packets;
   generating second digital codes according to a number of bytes of the second plurality of digital signals received during an interval of the predefined number of cycles of the clock according to the third clock rate; and
   recovering the second clock rate with either the generated second digital codes and the third clock rate or the digital codes of the second clock rate unpacked from the deserialized one or more forward data packets.

22. The signal conversion device as recited in claim 18, further comprising:
a return serializer that receives the one or more return data packets from the return packing circuit, serializes the one or more return data packets, and transmits the serialized one or more return data packets at the fourth clock rate.

23. The signal conversion device as recited in claim 22, wherein the return serializer transmits the serialized one or more return data packets over one or more fiber optic channels, over one or more copper wires, or wirelessly.

* * * * *